(12) United States Patent
Maughan et al.

(10) Patent No.: US 6,536,779 B1
(45) Date of Patent: Mar. 25, 2003

(54) SLEEVED DUST COVER

(75) Inventors: Garth Maughan, Delta, OH (US); Greg Fleniken, Toledo, OH (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 09/469,801

(22) Filed: Dec. 22, 1999

(51) Int. Cl.$^7$ ................................................ F16J 15/52
(52) U.S. Cl. ........................ 277/635; 277/637; 464/173; 464/175; 403/134
(58) Field of Search ................................ 277/634, 636, 277/637, 635; 464/173, 175; 403/134

(56) References Cited

U.S. PATENT DOCUMENTS

| | | | |
|---|---|---|---|
| 3,135,539 A | * 6/1964 | Ulderup et al. | ............... 403/36 |
| 3,291,511 A | 12/1966 | Langen | |
| 3,858,412 A | * 1/1975 | Fisher et al. | |
| 4,019,612 A | * 4/1977 | Mathews et al. | |
| 4,121,844 A | * 10/1978 | Nemoto et al. | |
| 4,347,014 A | 8/1982 | Smith | |
| 4,575,162 A | * 3/1986 | Smith | ............... 384/2 |
| 4,627,826 A | * 12/1986 | Juziuk et al. | |
| 4,927,678 A | * 5/1990 | Lallement | |
| 4,979,844 A | 12/1990 | Teramachi | |
| 5,006,376 A | * 4/1991 | Arima et al. | |
| 5,183,351 A | * 2/1993 | Schneider | |
| 5,403,982 A | * 4/1995 | Nolte et al. | ............... 200/302.1 |
| 5,525,112 A | * 6/1996 | Smith | |
| 5,839,845 A | 11/1998 | Kincaid et al. | |

FOREIGN PATENT DOCUMENTS

| | | |
|---|---|---|
| DE | 003814695 A1 | * 11/1989 |
| JP | 401307508 A | * 12/1989 |

* cited by examiner

Primary Examiner—Anthony Knight
Assistant Examiner—Vishal Patel
(74) Attorney, Agent, or Firm—Rader, Fishman & Grauer PLLC

(57) ABSTRACT

The invention relates to an improved dust cover a ball and socket joint. The dust cover includes an elongated sleeved body portion and a hinged portion. The sleeved body portion is constructed of a flexible, elastomeric material and is sized such that the sleeved body portion must be stretched over a joint housing to frictionally engage an exterior side wall of the joint housing without requiring any additional fasteners. The hinged portion includes a sealing lip that seals around a shank of a ball stud and a plurality of hinges that provide additional surface material for the dust cover for increased flexibility. The dust cover includes at least three hinges, a first upper hinge, a second upper hinge and a lower hinge positioned therebetween. The first upper hinge is offset from the second upper hinge such that the first upper hinge is positioned higher than the second upper hinge. The offset serves to distribute planar and torsional twisting along the hinged portion for increased flexibility of the dust cover.

12 Claims, 1 Drawing Sheet

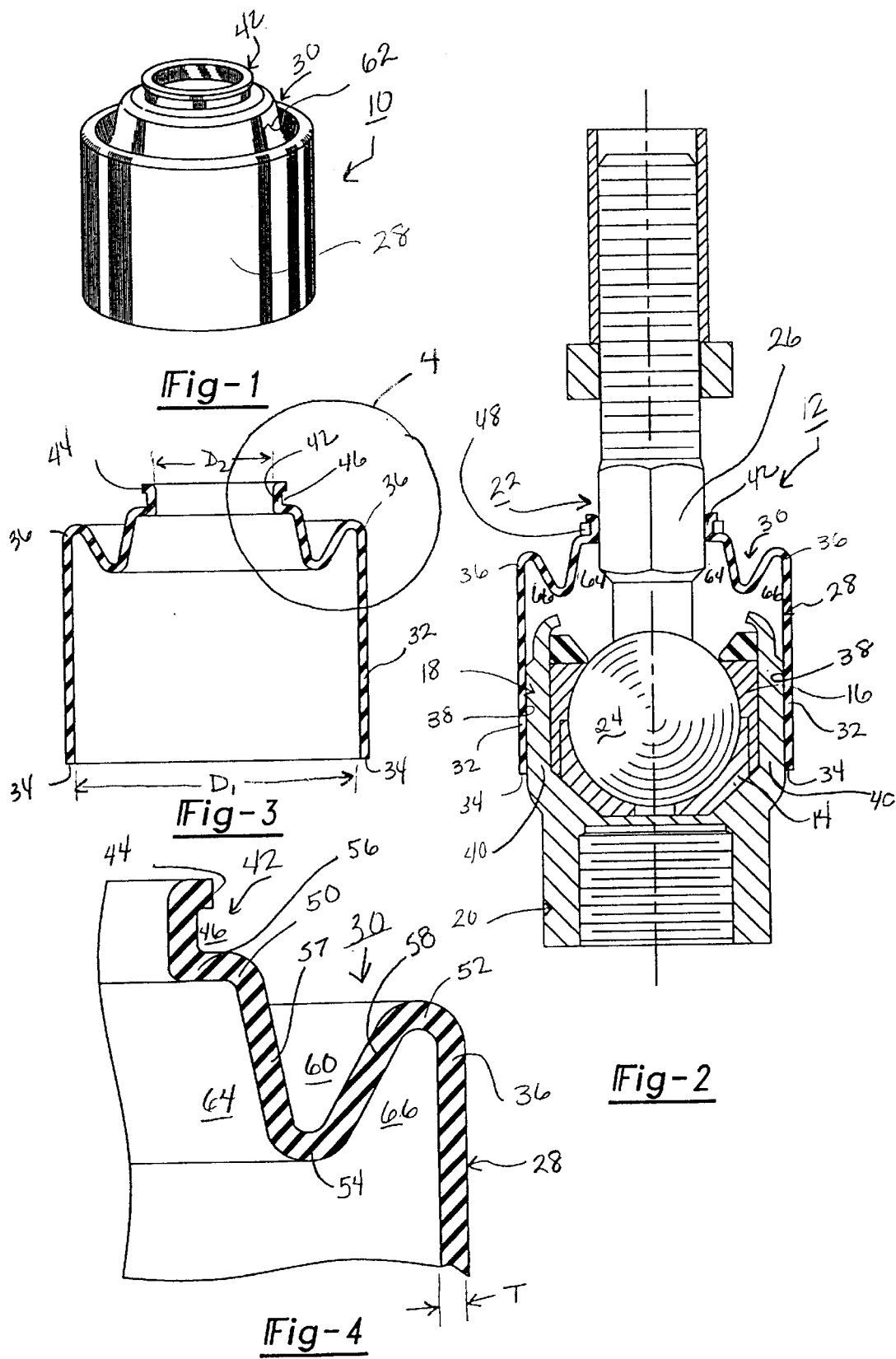

SLEEVED DUST COVER

FIELD OF THE INVENTION

The present invention relates generally to a dust boot for a ball and socket joint. More particularly, the invention relates to a dust cover that has an elongated sleeved body portion and a hinged upper portion that permits the joint to move through its range of motion while reducing wear of the dust boot.

BACKGROUND OF THE INVENTION

Ball and socket joints are used in a variety of applications, including rack and pinion inner tie rod socket assemblies, steering knuckles, drag links, and connecting rod assemblies. Ball and socket joints typically include a generally cylindrical socket adapted to receive a bearing together with a head of a ball stud. Ball joints further typically include a dust cover for sealing the opening between the socket and the ball stud to keep contaminants, such as debris and foreign fluid, out of the ball and socket joint to prolong the wear life of the joint.

Known ball and socket joints include a machined groove around the outside of the socket. The side wall of the dust cover is externally attached to the housing by means of a spring wire clip that cooperates with the external groove. However, this method of attachment of the dust cover has disadvantages. First, the groove must be machined into the housing to precise tolerances. The machining step increases production costs. Further, grooves that do not achieve the desired tolerance range result in wasted material. Additionally, a spring wire clip must be incorporated into the seal.

However, the incorporation of a spring wire clip increases handling and assembly costs. Spring wire clips also may become distorted and/or incorrectly installed around the dust cover during assembly which could compromise sealing effectiveness and increase the potential for dust cover damage. In addition, the spring wire clip may become dislodged during operation of the joint such that the dust cover may uncover the joint, exposing the internal components of the joint to contaminants.

Another known ball and socket joint includes a press-on type dust cover. Press-on dust covers have an integral flange containing a flat spring steel insert having biting edges. To attach the dust cover to the socket, the integral flange is pressed down over the hollow-milled socket until properly positioned. The biting edges secure the dust cover against the side of the hollow-milled area of the socket housing. Press-on dust covers are undesirable as the expense to produce the dust covers is increased because of the costs associated with the integral spring steel insert. Further, there is an increased potential for damage to the dust cover when pressing it onto the socket housing due to overpressing.

Other known ball and socket joints include a "sliding" type dust cover. Sliding type dust covers have a short side wall that extends around the edge of the socket housing near the housing opening and slide along the ball stud as the stud oscillates up and down. To insure against bunching up or bowing ("wrapping up") as the dust cover is continually forced to slide up and down to follow the motion of the ball stud, sliding dust covers include thick, short side walls having a typical thickness in the range of 0.090"–0.120" (2.286 mm–3.048 mm). In some instances, the sliding dust covers also incorporate surface ribs to reduce the flexibility of the side wall for increased tracking of the dust cover with the ball stud. However, sliding dust covers are disadvantageous in applications where the joint has considerable range of stud motion as the short, thick side walls used in sliding dust covers may become dislodged from the socket during operation, thereby exposing the internal components of the joint to corrosive effects of the environment.

SUMMARY OF THE INVENTION

The present invention is relates to an improved dust cover for use with a conventional ball and socket joint for keeping debris and foreign fluid out of the joint. The ball and socket joint includes a joint housing, inner and outer bearings, and a ball stud. In accordance with the invention, the dust cover is constructed of a flexible, elastomeric material having a generally M-shaped cross-section. The dust cover includes an elongated sleeved body portion that defines a first diameter and a hinged upper portion that defines a second diameter.

The sleeved body portion has a generally cylindrical shape that corresponds to shape of the socket housing and a diameter that is slightly smaller than the diameter of the housing. The thickness of the dust boot is generally thinner than known dust covers, preferably between 0.040"–0.060" (1.016 mm–1.524 mm) to provide greater flexibility of the dust cover flexibility during ball stud articulation.

After assembly of the ball joint, the sleeved body portion of the dust cover is stretched over the joint housing such that the sleeved body section tightly encircles and grips the side wall of the joint housing substantially below the socket opening. Preferably, a distal end of the sleeved body portion is positioned at a bottom section of the joint housing, spaced away from the joint housing opening. Because the first diameter of the sleeved body portion is slightly smaller than the housing diameter, once the sleeved body portion is stretched over the joint housing, a section of the sleeved body portion is frictionally retained on the housing without requiring any additional fasteners. Further, the elongated nature of the body portion of the dust cover provides additional surface contact between the dust cover and the housing as compared to known dust boots, such that the body portion does not slide during ball joint operation. Thus, accidental dislodgment of the body portion from the housing is substantially eliminated, preventing the ball joint components from being exposed to debris, water and other contaminants.

The hinged portion of the dust cover includes a sealing lip, upper hinges, and a lower hinge. The sealing lip defines the second diameter of the dust cover. The second diameter is substantially smaller than the first diameter of the sleeved body portion and is sized such that an interior surface tightly encircles a shank of the ball stud. The outer surface of the sealing lip has a channel-shaped groove formed therein. The channel-shaped groove receives a fastening ring to securely seal the sealing lip against the ball stud.

The sealing lip and a transition end of the sleeved body portion are connected together by the upper and lower hinges. The hinges serve to provide additional surface material such that the hinged portion of the dust cover has increased flexibility, thereby prolonging wear life of the dust cover. In the preferred embodiment, the hinged portion includes a first upper hinge positioned adjacent to and extending outwardly and downwardly from the sealing lip. A second upper hinge positioned adjacent to and extending inwardly and downwardly from a top portion of the sleeved body portion. The lower hinge is positioned between the first and second minor hinges, forming an external groove on an outer top surface of the dust cover between the first and second upper hinges and providing internal grease nest areas on either side of the lower hinge. The first upper hinge is offset so as to be slightly higher than the second upper hinge. Due to the offset hinges, planar and torsional twisting of the dust cover are distributed over the hinges. Thus, the dust cover may simultaneously follow the articulation and rotation of the ball stud with only minor and inconsequential wrapping up of the dust cover material.

BRIEF DESCRIPTION OF THE DRAWINGS

The features and inventive aspects of the present invention will become more apparent upon reading the following detailed description, claims, and drawings, of which the following is a brief description:

FIG. 1 is a perspective view of a dust cover in accordance with the present invention.

FIG. 2 is a cross-sectional view of a ball and socket joint with the dust cover of the present invention assembled thereto.

FIG. 3 is a cross-sectional view of the dust cover of the present invention.

FIG. 4 is an enlarged cross-sectional view of an upper portion of the dust cover shown by encircled region 4 of FIG. 3.

DETAILED DESCRIPTION OF PREFERRED EMBODIMENTS

Referring to FIGS. 1–4, an improved dust cover 10 for use with a ball and socket joint 12 is shown. Ball and socket joint 12 includes inner and outer bearings 14 and 16, a joint housing 18, a mounting section 20 and a ball stud 22, as best seen in FIG. 2. Inner and outer bearings 14 and 16 are assembled within joint housing 18 with a head 24 of ball stud 22 captured within a cavity formed by inner and outer bearings 14 and 16. A shank 26 of ball stud 22 extends away from joint housing 18.

Dust cover 10 is constructed of a flexible thermoplastic elastomer material such as thermoplastic polyurethane, and has a generally M-shaped cross-section, as best seen in FIG. 3. Preferably, the dust cover material has a relatively thin wall, as compared to known dust covers, with a thickness T that is in the range of 0.040"–0.060" (1.016 mm–1.524 mm) to provide increased flexibility of the dust cover 10.

In accordance with the invention, dust cover 10 includes an elongated sleeved body portion 28 and a hinged portion 30. Sleeved body portion 28 defines a first diameter $D_1$, and includes a gripping portion 32, a distal end 34 and a transition end 36. First diameter $D_1$ is equal to or slightly smaller than the diameter of the joint housing 18 such that gripping portion 32 tightly encircles and grips the side wall 38 of joint housing 28 when gripping portion 32 is stretched over joint housing 18. Because the first diameter $D_1$ is equal to or slightly smaller than the diameter of joint housing 18, sleeved body portion 28 is frictionally retained on joint housing 18 without requiring any additional fasteners. Further, the elongated sleeved body portion 28 provides additional surface contact between dust cover 10 and joint housing 18 as compared to known prior art devices, such that sleeved body portion 28 grips side wall 38 of joint housing 18, to prevent sleeved body portion 28 from sliding off of joint housing during operation of joint 12. Sleeved body portion 28 is positioned adjacent to a bottom section 40 such that at least half the length of joint housing 18 is positioned within sleeved body portion 28 to provide sufficient surface contact between dust cover 10 and side wall 38 of joint housing 18. It is preferred that sleeved body portion 28 has a sufficient length such that distal end 34 of gripping portion 32 is positioned substantially at a bottom section 40 of joint housing 18, just above mounting section 20. Stretching sleeved body portion 28 over the majority of joint housing 18 increases the amount of surface contact between gripping portion 32 and side wall 38, thereby frictionally securing sleeved body portion 28 to joint housing 18. Thus, accidental dislodging of dust cover 10 from joint housing 18 is substantially limited, preventing components of joint 12 from being exposed to debris, water and other contaminants.

Hinged portion 30 extends from transition end 36 of sleeved body portion 28 and terminates in a sealing lip 42 that defines a second diameter $D_2$. Second diameter $D_2$ is smaller than first diameter $D_1$, and is sized to tightly encircle shank 26 of ball stud 22. Sealing lip 42 is secured to shank 26 by a fastener. In the preferred embodiment, an outer surface 44 of sealing lip 42 includes a channel shaped groove 46 formed therein. Channel shaped groove 46 receives a fastener ring 48 to securely seal an interior surface 47 of sealing lip 42 to shank 26. Other suitable fasteners may also be employed. Once sealing lip 42 is secured to shank 26 and gripping portion 32 of sleeved body portion 28 is frictionally engaged with side wall 38 of joint housing 18, the components of joint 12 are sealed against contaminants.

In accordance with another aspect of the invention, sealing lip 42 and sleeved body portion 28 are connected together a plurality of integral hinges 50, 52, and 54. Hinges 50, 52, and 54 serve to provide additional surface material such that hinged portion 30 of dust cover 10 has increased flexibility to provide for prolonged wear life of dust cover 10. In the preferred embodiment, hinged portion 30 includes a first upper hinge 50, a second upper hinge 52 and a lower hinge 54. First upper hinge 50 is connected to sealing lip 42 and includes a first arm 56 extending laterally away from sealing lip 42 and a second arm 57 extending downwardly and outwardly at an angle from sealing lip 42. Second upper hinge 52 is connected to sleeved body portion 28 and includes vertically extending transition end 36 and a hinge arm 58 extending downwardly and inwardly at an angle from sleeved body portion 28. Lower hinge 54 is positioned between first and second upper hinges 50 and 52, respectively, and operates to connect hinges 50 and 52 together. Lower hinge 54 is spaced away from a top surface 59 of joint housing 18 so as to increase flexibility of dust cover 10.

An external groove 60 is formed on an external surface 62 of hinged portion 30 and corresponding internal grooves 64 and 66 are formed on either side of lower hinge 54. Internal grooves 64 and 66 operate as grease nests for re-lubricating joint 12 during articulation of ball stud 22.

It is preferred that first and second upper hinges 50 and 52 are arranged with an offset height positioning, whereby first upper hinge 50 is positioned higher than second upper hinge 52. The offset height of first and second upper hinges 50 and 52, respectively, coupled with the extra surface material of dust cover 10 provided by hinges 50, 52 and 54, serve to minimize motion and loading effects of joint 12 on dust cover 10 by distributing planar and torsional twisting of dust cover 10 over hinge portion 30. Thus, dust cover 10 is permitted to simultaneously follow the articulation and rotation of ball stud 22 with only minor and inconsequential wrapping up of dust cover 10 material. Because dust cover 10 material wrap-up is minimized, the functional wear life of dust boot 10 is extended.

Preferred embodiments of the present invention have been disclosed. A person of ordinary skill in the art would realize, however, that certain modifications would come within the teachings of this invention. Therefore, the following claims should be studied to determine the true scope and content of the invention.

What is claimed is:

1. An improved ball and socket joint comprising,
a joint housing for receiving a ball stud; and
a dust cover comprising
an elongated sleeved body portion formed of a flexible elastomeric material having a transition end, a gripping portion and a distal end, said gripping portion being positioned between said transition end and said distal end, wherein said elongated sleeved body encircles the joint housing with the length of said gripping portion frictionally engaging an exterior surface of a side wall of the joint housing without any fasteners; and
a hinged portion including a sealing lip and at least three hinges for providing additional surface material for said dust cover such that said dust cover has increased flexibility;
wherein said sealing lip includes an aperture for receiving the ball stud, an interior surface of said sealing lip being sealed against a shank of said ball stud;
wherein said at least three hinges includes a first upper hinge, a second upper hinge and a lower hinge, said first upper hinge including a first upper hinge arm extending laterally away from said sealing lip and a second upper hinge arm spaced away from said sealing lip and extending downwardly and at an angle away from said sealing lip, said second upper hinge being positioned adjacent to said transition end of said elongated sleeved body portion such that said transition end and a third upper hinge arm forms said second hinge, wherein said third hinge arm extends inwardly and downwardly at an angle from said transition end of said transition end, and said lower hinge being positioned between and connecting said first and second upper hinges and being formed by said second and third hinge arms such that an apex of said lower hinge is positioned below both of said first and second hinges, wherein said first upper hinge is offset from said second upper hinge such that an apex of said first upper hinge has a height that is greater than said second upper hinge, wherein said offset serves to distribute torsional and planar twisting of said dust cover along said hinged portion during articulation and rotation of the ball stud to increase flexibility of said dust cover.

2. The ball and socket joint of claim 1, wherein said dust cover material has a thickness less than 0.090".

3. The ball and socket joint of claim 2, wherein said dust cover material has a thickness in the range of approximately 0.040"–0.060".

4. The ball and socket joint of claim 1, herein said upper hinge arms of said first upper hinge cooperate with said lower hinge and the shank of said ball stud to define a grease nest in the interior of said dust cover.

5. The ball and socket joint of claim 1, wherein said transition end of said elongated sleeved body portion cooperates with said second upper hinge arm and said lower hinge to define a grease nest in the interior of said dust cover.

6. The ball and socket joint of claim 1, wherein said first upper hinge includes a first upper hinge first arm extending laterally away from said sealing lip and a first upper hinge second arm extending downwardly and outwardly from said sealing lip.

7. The ball and socket joint of claim 6 wherein said second upper hinge includes said transition end of said elongated sleeved body portion and a second upper hinge arm extending downwardly and inwardly from said elongated sleeved body portion.

8. The dust cover of claim 1, wherein said lower hinge is spaced away from a top surface of the joint housing so as to provide greater flexibility of said dust cover.

9. The ball and socket joint of claim 1, wherein said elongated sleeved body portion has a diameter slightly less than the diameter of the joint housing such that said gripping portion of said elongated sleeved body portion has a sufficient length to be frictionally retained against the side wall of said joint housing to prevent said dust cover from sliding along the side wall of the joint housing during articulation and rotation of the ball stud.

10. The ball and socket joint of claim 9, wherein said distal end of said elongated sleeved body portion is positioned adjacent to a bottom section of the joint housing such that at least half the length of the joint housing is positioned within said elongated sleeved body portion so as to provide sufficient surface contact between said dust cover and the side wall of said joint housing to prevent said dust cover from sliding during articulation of the ball stud.

11. The ball and socket joint of claim 10, wherein said sealing lip includes an upper outwardly extending portion and a lower outwardly extending portion spaced from said upper outwardly extending portion by a center portion, said upper and lower outwardly extending portions cooperating to define a channel shaped groove formed on an external surface of said sealing lip, said channel shaped groove receiving a fastener to seal said sealing lip against the ball stud.

12. An improved ball and socket joint comprising,
a joint housing for receiving a ball stud; and
a dust cover comprising
an integral hinged portion including a sealing lip having an aperture for receiving a ball stud, and a first upper hinge, a second upper hinge and a lower hinge for providing additional surface material for the dust cover such that said dust cover has increased flexibility; and
an elongated sleeved body portion formed of a flexible elastomeric material having a transition end, a gripping portion and a distal end, said gripping portion being positioned between said transition end and said distal end; wherein said elongated sleeved body portion has a size and shape that substantially corresponds to the shape of the joint housing and has a length that is longer than the length of said integral hinged portion, said elongated sleeved body portion being stretched over said joint housing such that said elongated sleeved body portion encircles the joint housing with the length of said gripping portion frictionally engaging a side wall of the joint housing without any fasteners, whereby said distal end of said elongated sleeved body portion is positioned adjacent to a bottom section of the joint housing such that at over half the length of the joint housing is positioned within said elongated sleeved body portion so to provide sufficient surface contact between said dust cover and the side wall of said joint housing to prevent said dust cover from sliding during articulation of the ball stud; and
wherein said first upper hinge is positioned adjacent to said sealing lip and including a first upper hinge arm extending laterally away from said sealing lip and a second upper hinge arm spaced away from said sealing lip and extending downwardly and at an angle away from said sealing lip, said second upper hinge being positioned adjacent to said transition end of said elongated sleeved body portion such that said transition end and a third upper hinge arm forms said second hinge, wherein said third hinge arm extends inwardly and downwardly at an angle from said transition end of said transition end, and said lower hinge being positioned between and connecting said first and second upper hinges such that an apex of said lower hinge is positioned below both of said first and second hinges, wherein said first upper hinge is offset from said second upper hinge such that an apex of said first upper hinge has a height that is greater than an apex of said second upper hinge, wherein said offset serves to distribute torsional and planar twisting of said dust cover along said hinged portion during articulation of the ball stud and said lower hinge is spaced away from an upper surface of the joint housing to increase flexibility of said dust cover.

* * * * *

UNITED STATES PATENT AND TRADEMARK OFFICE
CERTIFICATE OF CORRECTION

PATENT NO.   : 6,536,779 B1
DATED        : March 25, 2003
INVENTOR(S)  : Garth B. Maughan et al.

It is certified that error appears in the above-identified patent and that said Letters Patent is hereby corrected as shown below:

Column 5,
Line 55, please change "herein" to -- wherein --.

Signed and Sealed this

Twelfth Day of August, 2003

JAMES E. ROGAN
*Director of the United States Patent and Trademark Office*

UNITED STATES PATENT AND TRADEMARK OFFICE
CERTIFICATE OF CORRECTION

PATENT NO.   : 6,536,779 B1
DATED        : March 25, 2003
INVENTOR(S)  : Garth B. Maughan et al.

It is certified that error appears in the above-identified patent and that said Letters Patent is hereby corrected as shown below:

Column 6,
Line 6, please change "dust cover" to -- ball and socket joint --.

Signed and Sealed this

Seventh Day of October, 2003

JAMES E. ROGAN
*Director of the United States Patent and Trademark Office*